(12) United States Patent
Fulleringer et al.

(10) Patent No.: US 12,460,979 B2
(45) Date of Patent: Nov. 4, 2025

(54) TORQUE TRANSMISSION AND MEASUREMENT ASSEMBLY FOR A TURBOMACHINE

(71) Applicant: SAFRAN HELICOPTER ENGINES, Bordes (FR)

(72) Inventors: Benjamin Nicolas Fulleringer, Moissy-Cramayel (FR); Rémi Joseph Lanquetin, Moissy-Cramayel (FR); Arnaud Georges Nifenecker, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 305 days.

(21) Appl. No.: 18/270,287

(22) PCT Filed: Dec. 29, 2021

(86) PCT No.: PCT/FR2021/052466
§ 371 (c)(1),
(2) Date: Jun. 29, 2023

(87) PCT Pub. No.: WO2022/144530
PCT Pub. Date: Jul. 7, 2022

(65) Prior Publication Data
US 2024/0053213 A1    Feb. 15, 2024

(30) Foreign Application Priority Data
Dec. 30, 2020   (FR) ........................ 2014235

(51) Int. Cl.
*G01L 3/08*   (2006.01)
(52) U.S. Cl.
CPC ...................... *G01L 3/08* (2013.01)
(58) Field of Classification Search
CPC ........... G01L 3/08; G01L 3/105; G01L 3/104
See application file for complete search history.

(56) References Cited

U.S. PATENT DOCUMENTS 3,823,608 A * 7/1974 Pantermuehl ........... G01L 3/105
                                                                73/862.332
5,065,633 A * 11/1991 Mercat .................... B62J 45/411
                                                                 280/256

(Continued)

FOREIGN PATENT DOCUMENTS

FR            3032525 A1    8/2016
WO    WO 2009141261 A1    11/2009

OTHER PUBLICATIONS

English Translation of International Patent Application No. PCT/FR2021/052466 International Search Report dated Apr. 11, 2022, 2 pages.

*Primary Examiner* — Freddie Kirkland, III
(74) *Attorney, Agent, or Firm* — Cozen O'Connor

(57) ABSTRACT

An assembly for measuring a torque transmitted between a first member and a second member of a turbomachine includes a pinion having a first annular portion and a second annular portion joining together at a connecting portion carrying a gearing of the pinion, said first and second annular portions extending axially in opposite directions, from the connecting portion. The pinion also includes an axial power shaft with a first area coupled to the first annular portion, and a second area for coupling to the second member, and a device for measuring the torsion between the first and second areas. The device includes a first phonic wheel on the power shaft, a second phonic wheel equipping the second annular portion of the pinion and axially aligned with the first phonic wheel, and an acquisition means axially aligned with and opposite to the first phonic wheel and the second phonic wheel and outputting a signal representative of an angular variation.

10 Claims, 2 Drawing Sheets

(56) References Cited

U.S. PATENT DOCUMENTS

| | | | |
|---|---|---|---|
| 8,464,598 B2* | 6/2013 | Cazaux | G01L 3/101 |
| | | | 73/862.08 |
| 9,708,926 B2 | 7/2017 | Curlier et al. | |
| 12,281,584 B2* | 4/2025 | Bouldin | G01P 3/488 |
| 2011/0056309 A1* | 3/2011 | Cazaux | G01L 3/109 |
| | | | 73/862.325 |

* cited by examiner

TORQUE TRANSMISSION AND MEASUREMENT ASSEMBLY FOR A TURBOMACHINE

CROSS-REFERENCE TO RELATED APPLICATIONS

This application is a US National phase Application of International Patent Application No. PCT/FR2021/052466 filed Dec. 29, 2021, which claims priority to FR No. 2014235 filed Dec. 30, 2020, titled "Torque transmission and measurement assembly for a turbomachine," both of which are hereby incorporated in their entireties.

TECHNICAL FIELD OF THE INVENTION

The invention relates to a torque transmission and measurement assembly for a turbomachine, such as a turbojet or a turboprop engine of an airplane.

PRIOR ART

A known example of a torque transmission and measurement assembly is disclosed in the document FR 3 032 525 A1.

FIG. 1 illustrates a torque transmission and measurement assembly 1 of the prior art produced by the Applicant, intended to equip a turbomachine. This includes a pinion 2 comprising a radially outer cylindrical portion 3 provided with an annular gearing 4, extending around an axis X, first and second annular portions 5, 6 are axially aligned with and opposite one another, respectively in a first and second direction D1, D2, and a connecting portion 7 extending radially between the cylindrical portion 3 and the annular portions 5, 6.

The terms radial, axial and circumferential are defined with respect to the X axis.

The gearing 4 is intended to cooperate with a complementary gearing of a first member of the turbomachine, forming a torque input or respectively output.

The connecting portion 2 is frustoconical and flares in the direction of the second direction D2.

The first annular portion 5 includes a frustoconical portion 5a extending in the continuation of the connecting portion 7 and a radially inner cylindrical portion 5b including splines 5c. The cylindrical portion 5b is guided in rotation relative to a fixed portion of the turbomachine, by a first bearing 8. The second annular portion 6 includes a frustoconical portion 6a narrowing in the second direction D2 and a radially inner cylindrical portion 6b. Said cylindrical portion 6b is guided in rotation relative to a fixed portion of the turbomachine, by a second bearing 9. The two frustoconical portions 5a, 6a join at their radially outer ends and join the radially inner end of the connecting portion 7.

Pinion 2 is coupled in rotation to a power shaft 10. In particular, said power shaft 10 extends along axis X inside the pinion 2 and includes a first end 11 and a second end 12. The first end 11 includes splines 13 cooperating with the complementary splines 5c of the pinion 2 so as to ensure coupling thereof in rotation. The second end 12 also includes splines 14 cooperating with complementary splines 15 of a second member 16 of the turbomachine forming a torque output or respectively input.

The power shaft 10 is guided in rotation by a third bearing 17 formed by a ball bearing mounted axially between a shoulder or an annular rib 18 of the power shaft 10 and a nut 19 screwed onto the power shaft 10.

A first phonic wheel 20 is mounted on the power shaft 10. The first phonic wheel 20 is formed by a ring including teeth 21 evenly spaced apart from each other over the circumference. The phonic wheel 20 is coupled in rotation to the power shaft 10.

A reference shaft 22 is mounted around an axially middle area of the power shaft 10. The reference shaft 22 includes a first end 23 located on the side of the first end 11 of the power shaft 10 and a second end 24 located on the side of the second end 12 of the power shaft 10.

The first end 23 of the reference shaft 22 is secured to the power shaft 10, for example by shrink-fitting or plating. The second end 24 of the reference shaft 22 includes a second phonic wheel 25 including teeth 26 evenly spaced apart from each other over the circumference, located axially at the teeth 21 of the first phonic wheel 20. The teeth 26 of the second phonic wheel 25 are located circumferentially between the teeth 21 of the first phonic wheel 20, as illustrated in FIG. 2.

The torque transmission and measurement assembly 1 further includes acquisition means 27 for measuring the torque, axially aligned with and opposite the first phonic wheel 20 and the second phonic wheel 25 and being configured to output a signal representative of an angular variation between the first phonic wheel 20 and the second phonic wheel 25.

As is known per se, the acquisition means 27 may be formed by an electromagnetic type sensor capable of generating an alternating signal proportional to the number of revolutions and teeth 21, 26 of the phonic wheels 20, 25 moving opposite the sensor 27.

The sensor 27 includes a permanent magnet and a coil, the magnet creating a magnetic field in the coil. This magnetic field may close either in the air or in the metal of the phonic wheel rotating in front of the sensor. Thus, flux variations in the coil appear and an alternating electromotive force (emf) appears at its terminals.

The flux variation induces an alternating voltage in the coil, whose frequency is equal to the passage frequency of the teeth 21, 26 of each phonic wheel 20, 25.

Calculation means allows deducing, from the signal originating from the sensor 27, the relative angular phase shift between the two phonic wheels 20, 25, this phase shift resulting from the angular deformation induced by the torque in the portion of the power shaft 10 located axially between the ends 23, 24 of the reference shaft 22.

Such a structure requires a large number of parts to be assembled. Such an assembly requires an accurate calibration operation of the phonic wheel of the reference shaft, and is therefore complex and expensive to implement.

Moreover, mounting the reference shaft 22 generates frictions at the second end 24 of the reference shaft 22 around the power shaft 10, these frictions leading to a hysteresis phenomenon affecting the accuracy of the torque measurement.

Moreover, the accuracy of the torque measurement requires a sufficient angular deformation of the power shaft 10. For this purpose, it should be ensured that the deformed axial area of the power shaft 10 is sufficient, which conditions the axial dimension of the transmission assembly 1. However, there is a need to reduce the axial size of the assembly 1.

DISCLOSURE OF THE INVENTION

The invention aims to overcome these drawbacks in a simple, effective and inexpensive manner.

To this end, the invention relates to an assembly for transmitting and measuring a torque transmitted between a first member and a second member of a turbomachine, comprising a pinion which includes a first annular portion and a second annular portion joining together at a connecting portion carrying a gearing of the pinion, said first and second annular portions extending axially according to an axis of rotation of the pinion in opposite directions, from the connecting portion, at least one of said annular portions being guided in rotation by a guide bearing of the pinion, the pinion further including a power shaft extending axially, said power shaft including a first area coupled in rotation to the first annular portion of the pinion, and a second area intended to be coupled in rotation to the second member of the turbomachine, the first area being spaced axially apart from the second area, and means for measuring the torsion of the power shaft disposed at a third area of the power shaft located between the first and second areas, said measuring means including at least one phonic wheel and acquisition means capable of cooperating with said phonic wheel, characterised in that the measuring means include a first phonic wheel equipping the third area of the power shaft and a second phonic wheel equipping the second annular portion of the pinion and located axially aligned with and opposite the first phonic wheel, the acquisition means being axially aligned with and opposite the first phonic wheel and the second phonic wheel and being configured to output a signal representative of an angular variation between the first phonic wheel and the second phonic wheel.

The terms axial, radial and circumferential are defined with respect to the aforementioned axis.

Such a structure allows limiting the number of parts as well as the axial size of the torque transmission and measurement assembly, in comparison with the prior art produced by the Applicant. Thus, tedious mounting and calibration operations are avoided. Such a structure also allows limiting or avoiding the aforementioned hysteresis phenomena.

The second annular portion of the pinion is not intended to transmit torque and therefore does not undergo torsion in operation. Thus, this portion serves as a reference shaft.

The assembly formed by the pinion and the power shaft may be made by additive manufacturing.

The second phonic wheel may be located at the free end of the second annular portion.

The pinion and the power shaft may be made in one-piece.

Thus, the first area of the power shaft forms a bridge of material between the power shaft and the pinion.

The one-piece making may be performed by additive manufacturing or by permanent assembly.

The second phonic wheel may be formed at one end of a cylindrical portion of the second annular portion of the pinion, said end being located opposite the junction between the second annular portion and the first annular portion of the pinion.

A guide bearing of the pinion may be mounted around said cylindrical portion to guide it in rotation.

The signal originating from the acquisition means may be transmitted to a calculation member configured to determine the torque transmitted by the power shaft from said signal.

The first area and the second area of the power shaft may be formed by a first axial end and an opposite second axial end of said power shaft.

The second area may include splines intended to cooperate with complementary splines of the second member of the turbomachine.

The first annular portion may comprise a cylindrical portion guided in rotation by a guide bearing of the pinion.

The first bearing and/or the second bearing may consist of roller, ball or needle bearings.

The power shaft may be guided in rotation by a third bearing. The third bearing may be located axially between the second and third areas. The third bearing may consist of a roller or ball bearing.

The third bearing may be interposed axially between a shoulder of the power shaft and a nut screwed onto said power shaft.

The first phonic wheel and/or the second phonic wheel may include teeth separated by recessed areas, one of the teeth and/or one of the recessed areas of the first phonic wheel and/or of the second phonic wheel having a circumferential dimension different from the other teeth or the other recessed areas of the corresponding phonic wheel.

In other words, the considered phonic wheel may have a tooth or a singular recessed area allowing determining the angular position of said phonic wheel.

The acquisition means may include a sensor of the electromagnetic type. The sensor may include a permanent magnet and a coil, the magnet being capable of creating a magnetic field in the coil.

The first annular portion and/or the second annular portion of the pinion may include a frustoconical portion and a cylindrical portion. Said cylindrical portion may be used to mount the bearing. Said frustoconical portions of the annular portions may join at their radially outer ends. A connecting area may connect the gearing of the pinion to the first and second annular portions. Said connecting area may be frustoconical.

The invention also relates to a turbomachine including an assembly of the aforementioned type The turbomachine may be a helicopter turbine engine, a turbojet or a turboprop engine of an airplane.

DETAILED DESCRIPTION OF THE INVENTION

Figure 1:
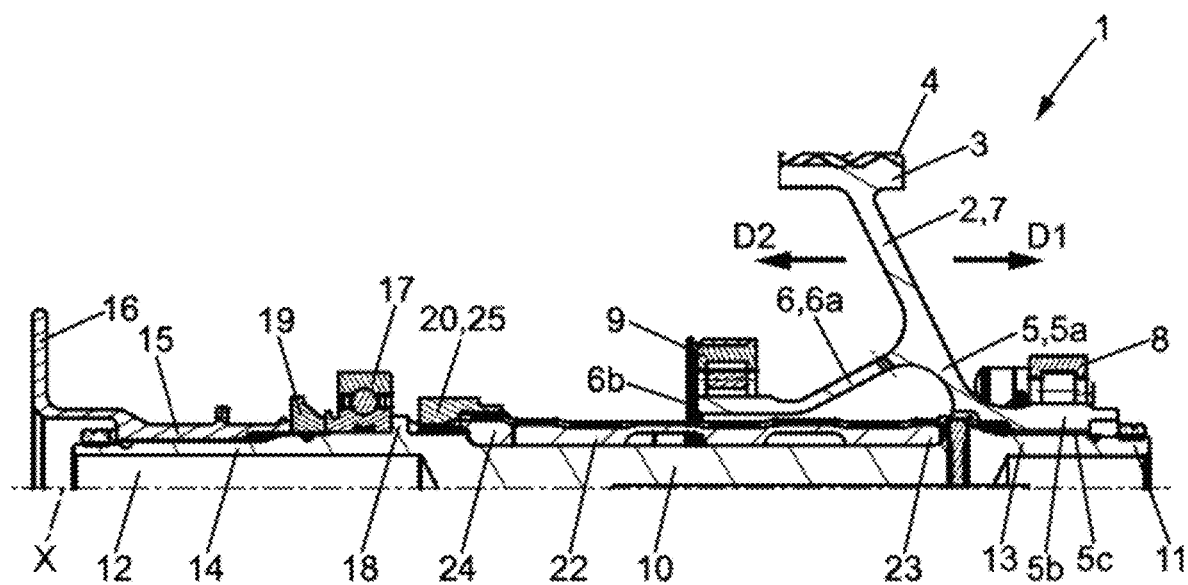
FIG. 1 is a half-view in axial section of a torque transmission and measurement assembly of the prior art produced by the Applicant.
Figure 2:
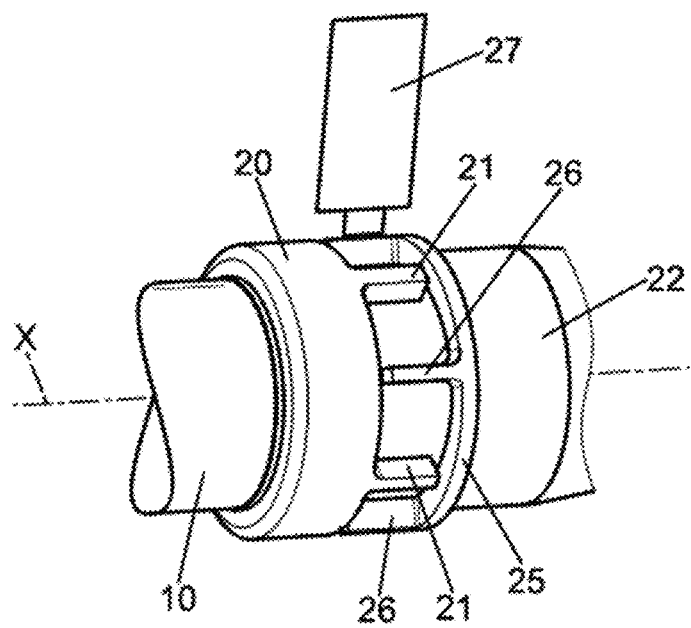
FIG. 2 is a schematic perspective view of the means for measuring the torsion of the power shaft of the assembly of FIG. 1.
Figure 3:
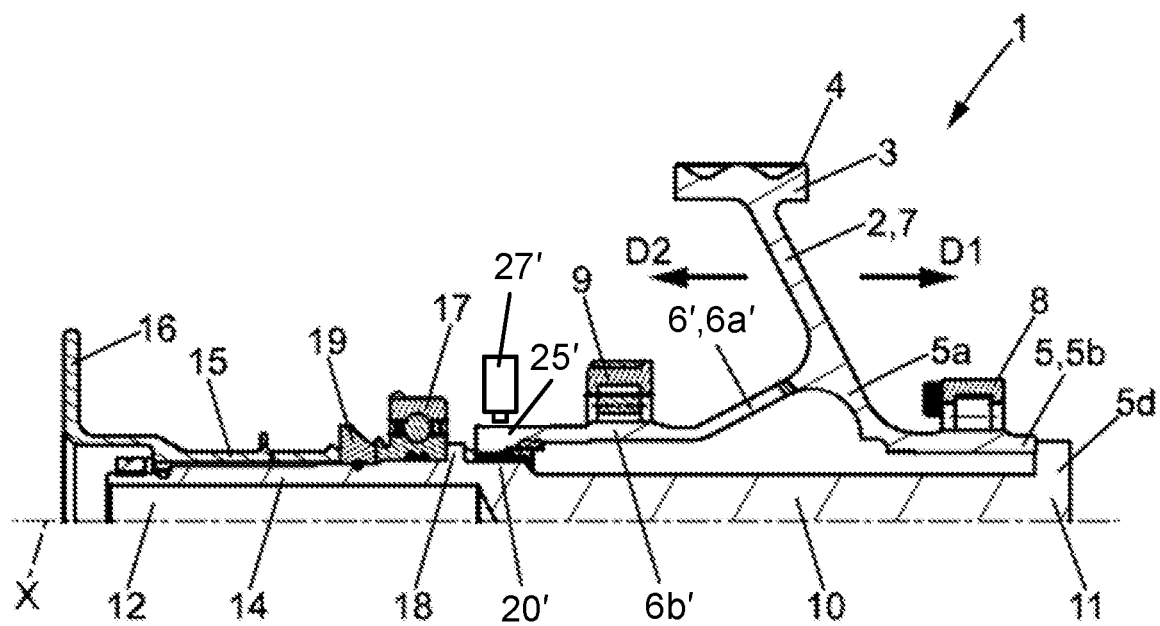
FIG. 3 is a half-view in axial section of a torque transmission assembly according to an embodiment of the invention.

FIG. 3 illustrates a torque transmission assembly according to an embodiment of the invention, intended to equip a turbomachine. This includes a pinion 2 comprising a radially outer cylindrical portion 3 provided with an annular gearing 4, extending around an axis X, first and second annular portions 5, 6' extending axially opposite one another, respectively in a first and second direction D1, D2, and a connecting portion 7 extending radially between the cylindrical portion 3 and the annular portions 5, 6'. The annular gearing 4 is carried by the connecting portion 7 and is a straight gearing in the represented example. Nevertheless, other gearing types are possible, such as a conical gearing.

The terms radial, axial and circumferential are defined with respect to the X axis.

The gearing 4 is intended to cooperate with a complementary gearing of a first member of the turbomachine, forming a torque input or respectively output.

The connecting portion 2 is frustoconical and flares in the direction of the second direction D2.

The first annular portion 5 includes a frustoconical portion 5a extending in the continuation of the connecting portion 7 and a radially inner cylindrical portion 5b including splines or an assembly solution such as welding, shrink-fitting, . . . . The cylindrical portion 5b is guided in rotation relative to a fixed portion of the turbomachine, by a first bearing 8. The second annular portion 6' includes a frustoconical portion 6a' narrowing in the second direction D2 and a radially inner cylindrical portion 6b'. Said cylindrical portion 6b' is guided in rotation relative to a fixed portion of the turbomachine, by a second bearing 9. The two frustoconical portions 5a, 6a' join at their radially outer ends and join the radially inner end of the connecting portion 7.

The pinion 2 is secured to and integral with a power shaft 10. In particular, said power shaft 10 extends along axis X inside the pinion 2 and includes a first end 11 and a second end 12. The first end 11 is connected to the corresponding end of the first annular portion 5, by a radial annular area 5d. The second end 12 includes splines 14 cooperating with complementary splines 15 of a second member 16 of the turbomachine forming a torque output or respectively input.

The power shaft 10 is guided in rotation by a third bearing 17 formed by a ball bearing mounted axially between a shoulder or an annular rib 18 of the power shaft 10 and a nut 19 screwed onto the power shaft 10.

A first phonic wheel 20' is formed in an axially middle area of the power shaft 10. The first phonic wheel 20' includes teeth 21 evenly spaced apart from each other over the circumference. The phonic wheel 20' is coupled in rotation to the power shaft 10.

The free end of the second annular portion includes a second phonic wheel 25' comprising teeth 26 evenly spaced apart from each other over the circumference, located axially at the teeth 21 of the first phonic wheel 20'. The teeth 26 of the second phonic wheel 25' are located circumferentially between the teeth 21 of the first phonic wheel 20'.

The assembly 1 further includes acquisition means 27' axially aligned with and opposite the first phonic wheel 20' and the second phonic wheel 25' and being configured to output a signal representative of an angular variation between first phonic wheel 20' and the second phonic wheel 25'.

As is known per se, the acquisition means 27' may be formed by an electromagnetic type sensor capable of generating an alternating signal proportional to the number of revolutions and teeth 21, 26 of the phonic wheels 20', 25' moving opposite the sensor 27'.

The sensor 27' includes a permanent magnet and a coil, the magnet creating a magnetic field in the coil. This magnetic field may close either in the air or in the metal of the phonic wheel rotating in front of the sensor. Thus, flux variations in the coil appear and an alternating electromotive force (emf) appears at its terminals.

The flux variation induces an alternating voltage in the coil, whose frequency is equal to the passage frequency of the teeth 21, 26 of each phonic wheel 20', 25'.

Calculation means allows deducing, from the signal originating from the sensor 27', the relative angular phase shift between the two phonic wheels 20', 25', this phase shift resulting from the angular deformation induced by the torque in the portion of the power shaft 10 located axially between the ends 23, 24 of the reference shaft 22.

The first phonic wheel 20' and/or the second phonic wheel 25' may include at least one tooth or at least one recessed area (delimited between two teeth) having a circumferential dimension different from the other teeth or the other recessed areas of the corresponding phonic wheel.

In other words, the considered phonic wheel 20', 25' may have a tooth or a singular recessed area allowing determining the angular position of said phonic wheel.

It should be noted that, in this embodiment, the assembly 1 has no more reference shaft. Such a structure allows limiting the number of parts as well as the axial size of the power transmission assembly 1, in comparison with the prior art produced by the Applicant. Thus, tedious mounting and calibration operations are avoided. Such a structure also allows limiting or avoiding the aforementioned hysteresis phenomena.

The second annular portion 6' of the pinion 2 is not intended to transmit torque and therefore does not undergo torsion in operation. Thus, this portion serves as a reference shaft.

The pinion 2 and the power shaft 10 may be made by additive manufacturing so as to make the part in one single operation.

The pinion 2 and the power shaft 10 may also be made by conventional machining means, with a process for assembling the two parts, such as welding.

The invention claimed is:

1. An assembly (1) for transmitting and measuring a torque transmitted between a first member and a second member (16) of a turbomachine, comprising:
   a pinion (2) which includes a first annular portion (5) and a second annular portion (6) joining together at a connecting portion (7) carrying a gearing (4) of the pinion (2), said first and second annular portions (5, 6) extending axially according to an axis of rotation (X) of the pinion (2) in opposite directions (D1, D2), from the connecting portion (7), at least one of said annular portions (5, 6) being guided in rotation by a guide bearing (8, 9) of the pinion (2), the pinion further including a power shaft (10) extending axially, said power shaft (10) including a first area (11) coupled in rotation to the first annular portion (5) of the pinion (2), and a second area (12) for coupling in rotation to the second member (16) of the turbomachine, the first area being spaced axially apart from the second area, and
   means for measuring the torsion of the power shaft (10) disposed at a third area of the power shaft (10) located between the first and second areas (11, 12), said means for measuring including
   a first phonic wheel (20) equipping the third area of the power shaft (10),
   a second phonic wheel (25) equipping the second annular portion (6) of the pinion (2) and axially aligned with the first phonic wheel (20), and
   an acquisition means (27) axially aligned with and opposite the first phonic wheel (20) and the second phonic wheel (25) and being configured to output a signal representative of an angular variation between the first phonic wheel (20) and the second phonic wheel (25).

2. The assembly (1) according to claim 1, characterised in that the pinion (2) and the power shaft (10) are made in one piece.

3. The assembly (1) according to claim 2, characterised in that the pinion (2) and the power shaft (10) are made in one piece by additive manufacturing or by permanent assembly.

4. The assembly (1) according to claim 1, characterised in that the second phonic wheel (25) is formed at one end of a cylindrical portion (6b) of the second annular portion (6) of the pinion (2), said end being located opposite the junction between the second annular portion (6) and the first annular portion (5) of the pinion (2).

5. The assembly (1) according to claim 4, characterised in that a guide bearing (9) of the pinion (2) is mounted around said cylindrical portion (6b) to guide it in rotation.

6. The assembly (1) according to claim 1, characterised in that the signal originating from the acquisition means (27) is transmitted to a calculation member configured to determine the torque transmitted by the power shaft (10) from said signal.

7. The assembly (1) according to claim 1, characterised in that the first area and the second area of the power shaft (10) are formed by a first axial end (11) and a second axial end (12) opposite said power shaft (10).

8. The assembly (1) according to claim 7, characterised in that the second area (12) includes splines (14) intended to cooperate with complementary splines (15) of the second member (16) of the turbomachine.

9. The assembly (1) according to claim 1, characterised in that the first annular portion (5) comprises a cylindrical portion (5b) guided in rotation by a guide bearing (8) of the pinion (2).

10. A turbomachine comprising the assembly (1) according to claim 1.

\* \* \* \* \*